(12) United States Patent
Verbeck, IV et al.

(10) Patent No.: US 12,474,323 B2
(45) Date of Patent: Nov. 18, 2025

(54) TECHNIQUES FOR DETECTION OF MOLECULES IN A SAMPLE USING FRACTIONIZATION AND SELECTIVE CAPTURE

(71) Applicant: University of North Texas, Denton, TX (US)

(72) Inventors: Guido Fridolin Verbeck, IV, Lewisville, TX (US); John Redmond, Frisco, TX (US); Tim Wing, Frisco, TX (US); Luke Keiser, Frisco, TX (US)

(73) Assignees: University of North Texas, Denton, TX (US); InspectIR Systems, Inc., Frisco, TX (US)

( * ) Notice: Subject to any disclaimer, the term of this patent is extended or adjusted under 35 U.S.C. 154(b) by 941 days.

(21) Appl. No.: 17/679,054

(22) Filed: Feb. 23, 2022

(65) Prior Publication Data

US 2022/0268759 A1 Aug. 25, 2022

Related U.S. Application Data

(60) Provisional application No. 63/159,971, filed on Mar. 11, 2021, provisional application No. 63/153,346, filed on Feb. 24, 2021.

(51) Int. Cl.
*G01N 33/497* (2006.01)
*G01N 1/40* (2006.01)

(52) U.S. Cl.
CPC ........... *G01N 33/497* (2013.01); *G01N 1/405* (2013.01); *Y10T 436/25375* (2015.01)

(58) Field of Classification Search
CPC ........ G01N 33/497; G01N 1/40; G01N 1/405; Y10T 436/24; Y10T 436/25;
(Continued)

(56) References Cited

U.S. PATENT DOCUMENTS 4,294,583 A * 10/1981 Leichnitz ............... G01N 31/12
73/23.3
2008/0078506 A1 4/2008 Verbeck et al.
(Continued)

FOREIGN PATENT DOCUMENTS

WO 2020/026120 A1 * 2/2020

*Primary Examiner* — Maureen Wallenhorst
(74) *Attorney, Agent, or Firm* — Norton Rose Fulbright US LLP

(57) ABSTRACT

An exemplary analysis system may include a fractionization device configured to separate a sample into various molecules that may be introduced to a sampling chamber having a molecule collector disposed therein. The molecule detector may be configured such that molecules of interest produced during fractionization adhere to the molecule collector. A heating element may introduce heat within the sampling chamber, causing release of at least a portion of the molecules adhered to the molecule collector. An analysis device (e.g., a mass spectrometer, a terahertz (THz) spectrometer, etc.) may detect the presence of the one or more molecules of interest from among molecules produced during the fractionization and generate an output representative of the identified molecule(s) of interest. The output may include information that quantitates a concentration of the molecule(s) of interest within sample.

20 Claims, 9 Drawing Sheets

(58) Field of Classification Search
CPC ..... Y10T 436/25125; Y10T 436/25375; Y10T 436/255; Y10T 436/25875
USPC ........... 422/69, 78, 80, 83, 84, 88, 527, 537; 436/147, 155, 173, 174, 175, 177, 178, 436/181
See application file for complete search history.

(56) References Cited

U.S. PATENT DOCUMENTS

| | | | |
|---|---|---|---|
| 2008/0078745 A1 | 4/2008 | Cordell et al. | |
| 2009/0042309 A1* | 2/2009 | Van Herpen | G01N 33/0047 422/83 |
| 2011/0259127 A1* | 10/2011 | Beer | G01N 1/02 73/864.71 |
| 2012/0180576 A1* | 7/2012 | Rafferty | H01J 49/049 73/863.11 |

* cited by examiner

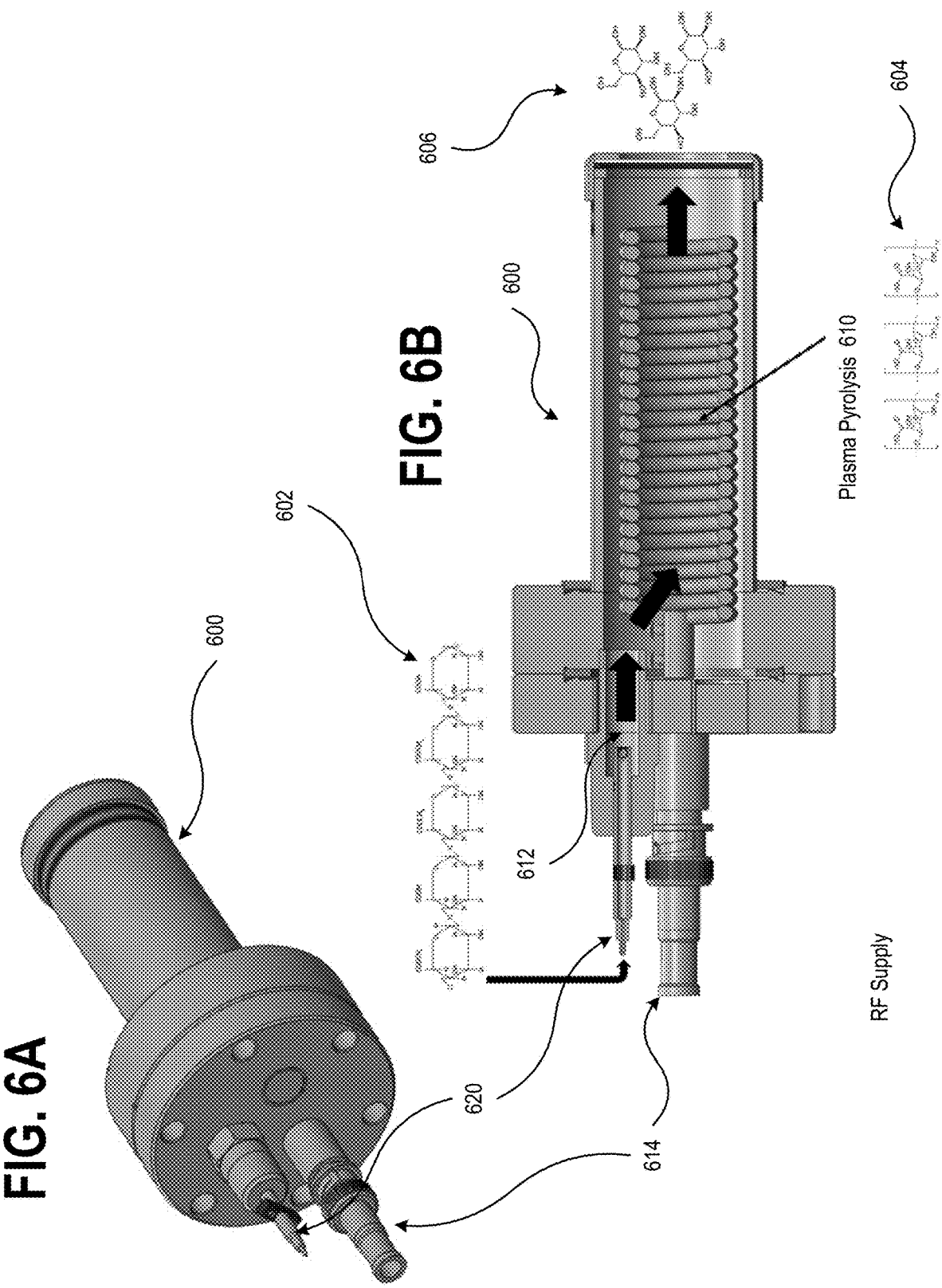

TECHNIQUES FOR DETECTION OF MOLECULES IN A SAMPLE USING FRACTIONIZATION AND SELECTIVE CAPTURE

CROSS-REFERENCE TO RELATED APPLICATIONS

The present application claims the benefit of U.S. Provisional Patent Application No. 63/159,971 entitled "TECHNIQUES FOR DETECTION OF MOLECULES IN A SAMPLE USING FRACTIONIZATION AND SELECTIVE CAPTURE", filed Mar. 11, 2021, and U.S. Provisional Patent Application No. 63/153,346 entitled "TECHNIQUES FOR DETECTION OF MOLECULES IN A SAMPLE USING FRACTIONIZATION AND SELECTIVE CAPTURE", filed Feb. 24, 2021, the contents of which are incorporated herein by reference in their entirety.

TECHNICAL FIELD

The present application relates to sample analysis systems and devices. More specifically the present application relates to systems and methods for rapid quantitative analysis of molecules in a sample via fractionization and selective capture techniques.

BACKGROUND

Fractionization is a process that involves heating a substance or material to a temperature (e.g., a temperature above a decomposition temperature of the substance or material) that causes the heated substance or material to break down into different molecules (e.g., as chemical bonds between the molecules are broken by the heating). Fractionization may be carried out in a variety of ways, such as using pyrolysis, plasma, corona discharge, laser ablation, and the like. Fractionization has been used in conjunction with analysis of molecules via a mass spectrometer. However, feeding the output of the fractionization process directly into the mass spectrometer introduces a significant amount of unwanted noise into the output of the mass spectrometer. To minimize the noise, previous fractionization-based mass spectrometer systems utilized gas chromatography (GC) techniques to separate the fractionization outputs prior to analysis via the mass spectrometer (e.g., to reduce the noise). However, the GC separation phase creates a delay of 15-30 minutes or more in the process and increases the costs and complexity of the system.

SUMMARY

Systems, apparatuses, methods, and computer-readable storage media providing techniques for analyzing a sample of a material are disclosed. Exemplary analysis systems and apparatuses of the present disclosure may include a fractionization device configured to fractionate a sample. The fractionization device may be configured to use pyrolysis, plasma, corona discharge, laser ablation, or another technique to fractionate the sample. Once fractionization is complete (or as fractionization occurs), molecules produced during the fractionization may be provided to a sampling chamber via an inlet establishing fluid communication between the fractionization device and the sampling chamber. In aspects, characteristics of the fractionization process may be controlled or adjusted to tune the fractionization of the sample, providing a measure of control over the molecules produced by the fractionization.

The sampling chamber may include a molecule collector configured to capture molecules of interest from among the molecules produced during the fractionization. The molecule collector may be formed from material tuned to capture a specific molecule or molecules. Alternatively or additionally, multiple sampling chambers, each having a molecule collector configured to capture a different molecule or set of molecules (e.g., fatty acids, ketones, aromatics, etc.) may be provided. The molecule collector(s) may have a form factor that provides a surface area sufficient to facilitate efficient capture of the molecules of interest. The sampling chamber may include a heating element configured to introduce or induce heat within the sampling chamber. The heat may be configured to cause resorption or release of at least a portion of the molecules captured or adhered to the molecule collector. Once released by the heat, the molecules may be provided to an analysis device (e.g., a mass spectrometer, a terahertz (THz) spectrometer, an infrared spectrometer, etc.) for detection of a presence of one or more molecules of interest subsequent to release of the molecules from the molecule collector, and an output generated that indicates the presence of at least one or more molecules of interest. The exemplary breath analysis systems and apparatuses may include an analysis device configured to identify and/or confirm the presence of one or more molecules of interest from among the molecules produced via the fractionization. The analysis device may be configured to generate an output representative of the identified one or more molecules of interest. The output may include information that quantitates a concentration of the one or more molecules of interest, which may enable identification or classification of the sample or other types of information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 6A is a partial view of a system for analyzing samples and illustrates devices and techniques for introducing samples for analysis in accordance with aspects of the present disclosure;

FIG. 6B is a partial view of a system for analyzing samples and illustrates devices and techniques for introducing samples for analysis in accordance with aspects of the present disclosure;

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

DETAILED DESCRIPTION

Figure 1:
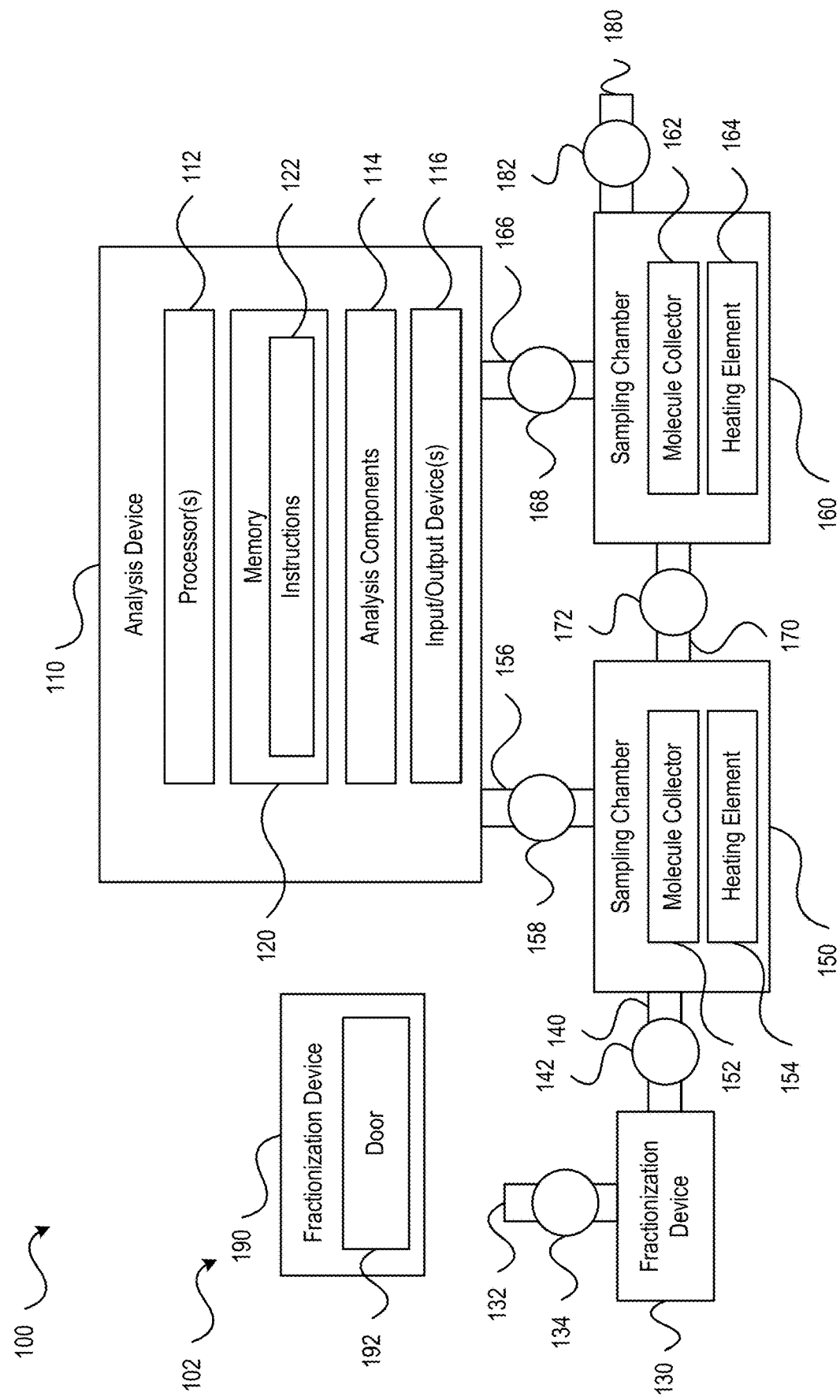
FIG. 1 illustrates a block diagram of a system for analyzing samples in accordance with aspects of the present disclosure.

Referring to FIG. 1, a block diagram of a system for analyzing samples in accordance with aspects of the present disclosure is shown as a system 100. As shown in FIG. 1, the system 100 includes an analysis device 110, a fractionization device 130, and one or more sampling chambers, shown in FIG. 1 as sampling chambers 150, 160. It is noted that while FIG. 1 shows the system 100 as including the two sampling chambers 150, 160, this is for purposes of illustration, rather than by way of limitation and systems in accordance with the present disclosure may include a single sampling chamber or more than two sampling chambers if desired. In aspects, each of the sampling chambers 150, 160 may be configured as a removable and/or disposable component of the system 100. In such an arrangement, the sampling chamber(s) may be removably coupled to the analysis device 110 and the fractionization device 130 for purposes of collecting a sample (or samples) for testing and analysis and then removed once the testing/analysis is complete. Configuring the sampling chamber(s) as a removable component of the system 100 may prevent contamination of consecutive samples analyzed by the analysis device 110. For example, a first sampling chamber may be utilized to perform analysis of a first sample and a second sampling chamber may be utilized to perform analysis of a second sample. Using different sampling chambers for different samples prevents one sample from potentially contaminating another sample. Where the sampling chamber(s) is configured as a disposable component, the sampling chamber(s) may be discarded after use or after a particular period of use, and where the sampling chamber(s) is configured as a reusable component, the sampling chamber(s) may be cleaned after each use or after the particular period of use. The particular period of use may be based on a period of time (e.g., after the sampling chamber(s) has been used for a number of minutes, hours, days, weeks, etc.), a number of samples tested (e.g., one sampling chamber use, two sampling chamber uses, and so on), or some other factor(s).

Figure 4A:
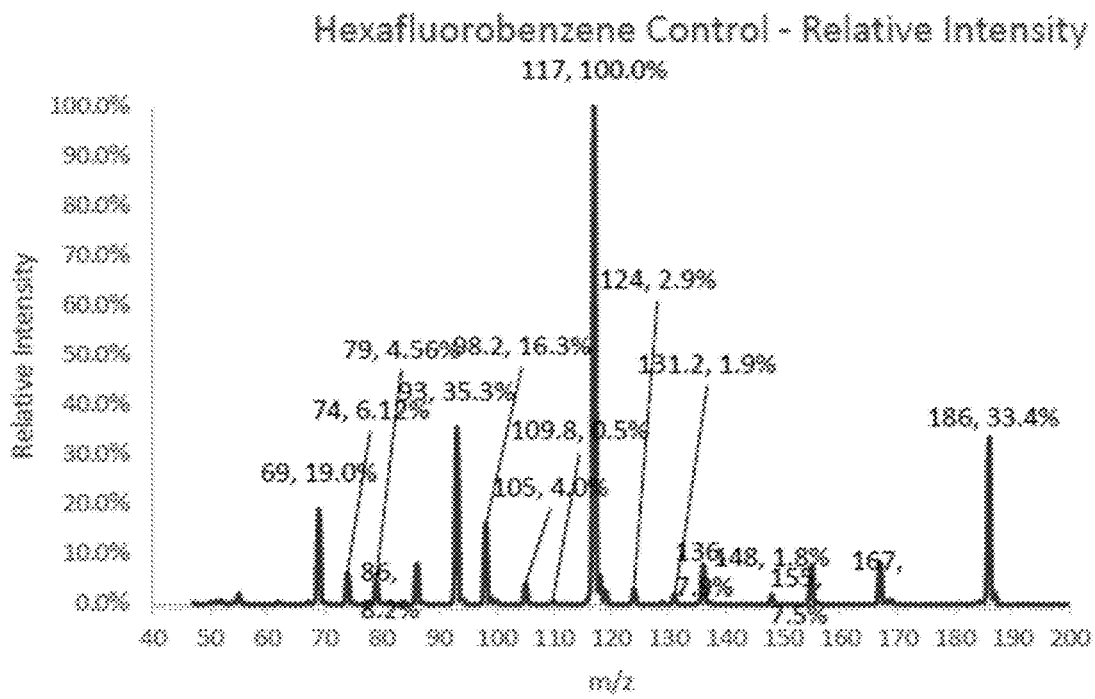
FIG. 4A is a diagram showing mass spectra observed using a system according to embodiments of the present disclosure.
Figure 4B:
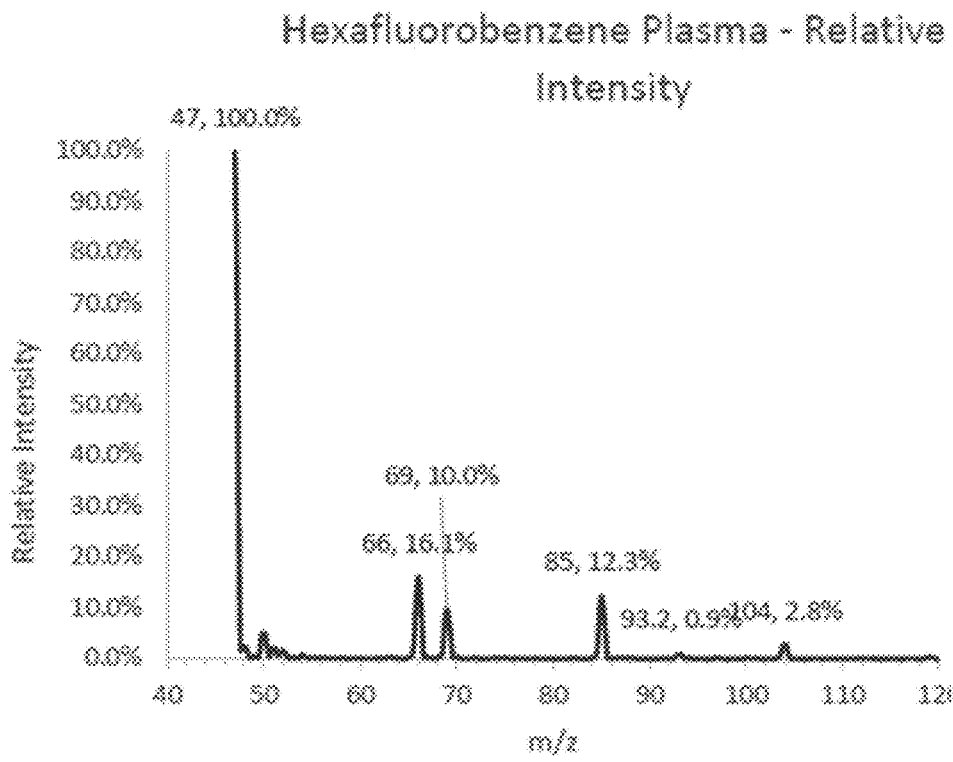
FIG. 4B is a diagram showing mass spectra observed using a system according to embodiments of the present disclosure.

The fractionization device 130 may be configured to separate large biological molecules and structures into smaller molecules for analysis by the analysis device 110. For example, the fractionization device 130 may utilize pyrolysis, plasma, corona discharge, laser ablation, or other fractionization techniques to separate a sample under test into one or more smaller molecules that may be analyzed by the analysis device 110. In an aspect, parameters of the fractionization device 130 may be configurable, thereby enabling the system 100 to control the manner in which fractionization of the samples are broken down into different molecules. Exemplary aspects of controlling fractionization using a fractionization device 130 of embodiments are illustrated in FIGS. 4A and 4B, which show diagrams illustrating fractionization of a sample using different plasma intensities. A mass spectra obtained from analyzing hexafluorobenzene fractionized using a control process (e.g., pyrolysis) is shown in FIG. 4A and a mass spectra obtained from analyzing hexafluorobenzene fractionized using a plasma process is shown in FIG. 4B.

Figure 4C:
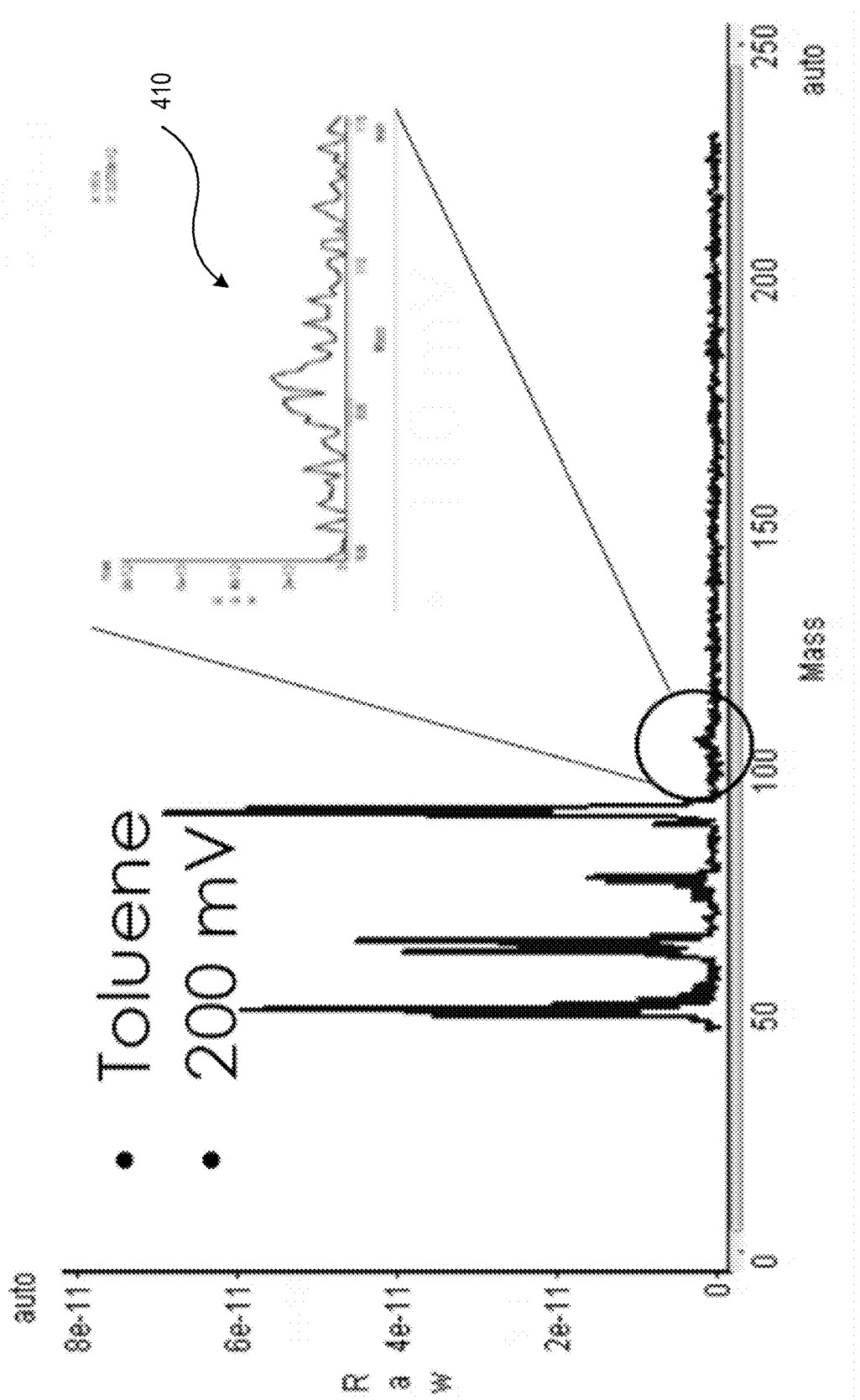
FIG. 4C is a diagram showing mass spectra observed using a system according to embodiments of the present disclosure.
Figure 4D:
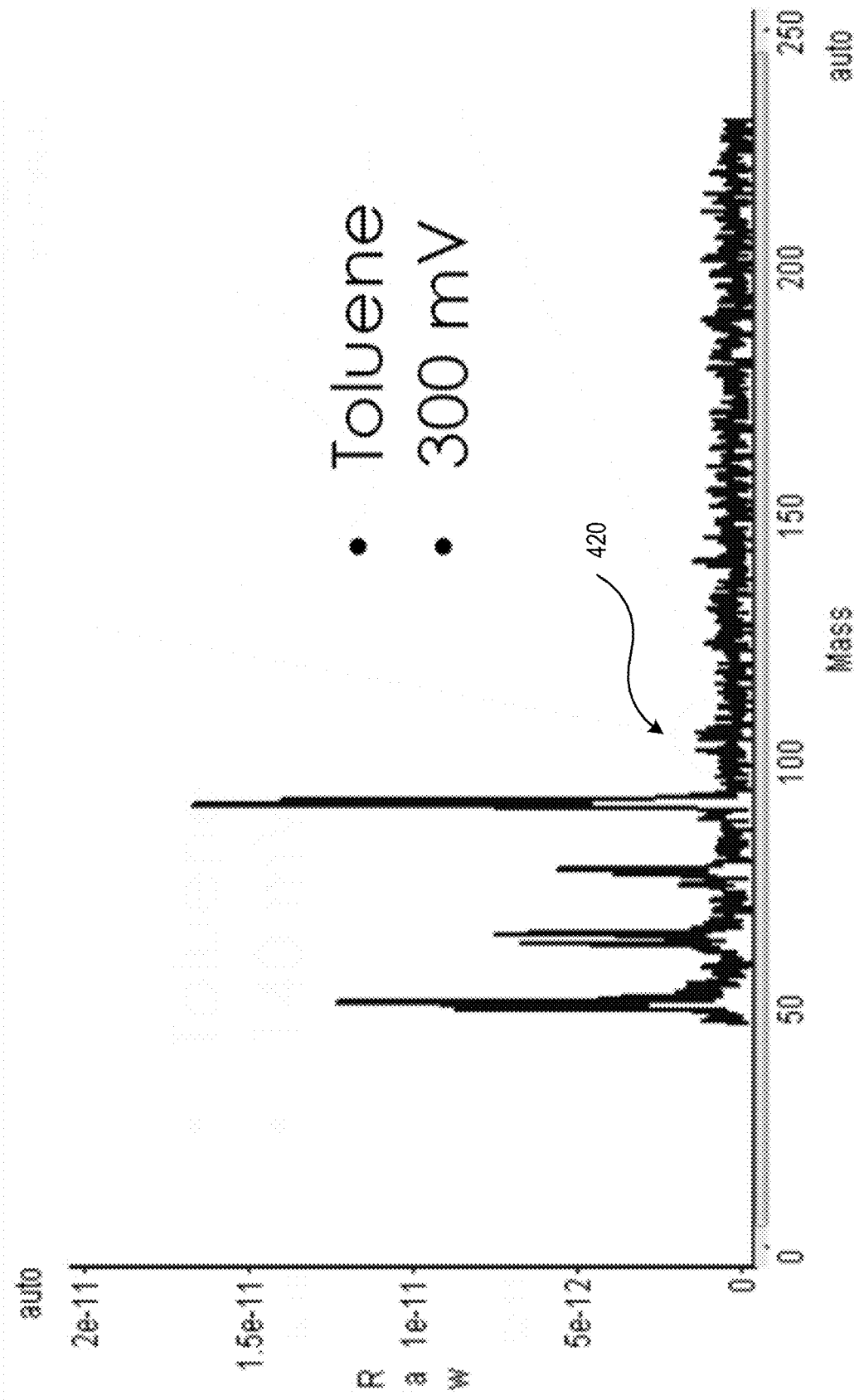
FIG. 4D is a diagram showing mass spectra observed using a system according to embodiments of the present disclosure.

As can be observed in the mass spectra shown in FIGS. 4A and 4B, the plasma fractionization process produced a peak at 47 m/z in FIG. 4B that was not apparent in the control process of FIG. 4A. Similarly, FIGS. 4A and 4B show different mass spectra that have observable peaks representing different molecules produced by the different fractionization processes, thereby illustrating the ability to control the molecules produced by different fractionization processes. In this manner, the fractionization process disclosed herein may be used to create fragments specific to a molecule (e.g., a molecule of interest). Such capabilities may enable systems in accordance with the present disclosure to be tune fractionization processes to produce fragments of target molecules of interest and may enable new signatures (e.g., peaks observable via mass spectrometry) to be identified, which may enable more accurate identification of target molecules, such as viruses, substances used in manufacture or use of drugs, clandestine activities (e.g., bomb making, etc.), or other purposes. In FIGS. 4C and 4D, diagrams illustrating toluene characterized using different plasma intensities are shown. As can be seen in FIGS. 4C, 4D, the 3 main peaks are clearly visible at different plasma intensities, and at excerpt 410 of FIG. 4C and region 420 of FIG. 4D, additional levels of detail can be more clearly seen using different intensity levels.

Figure 2A:
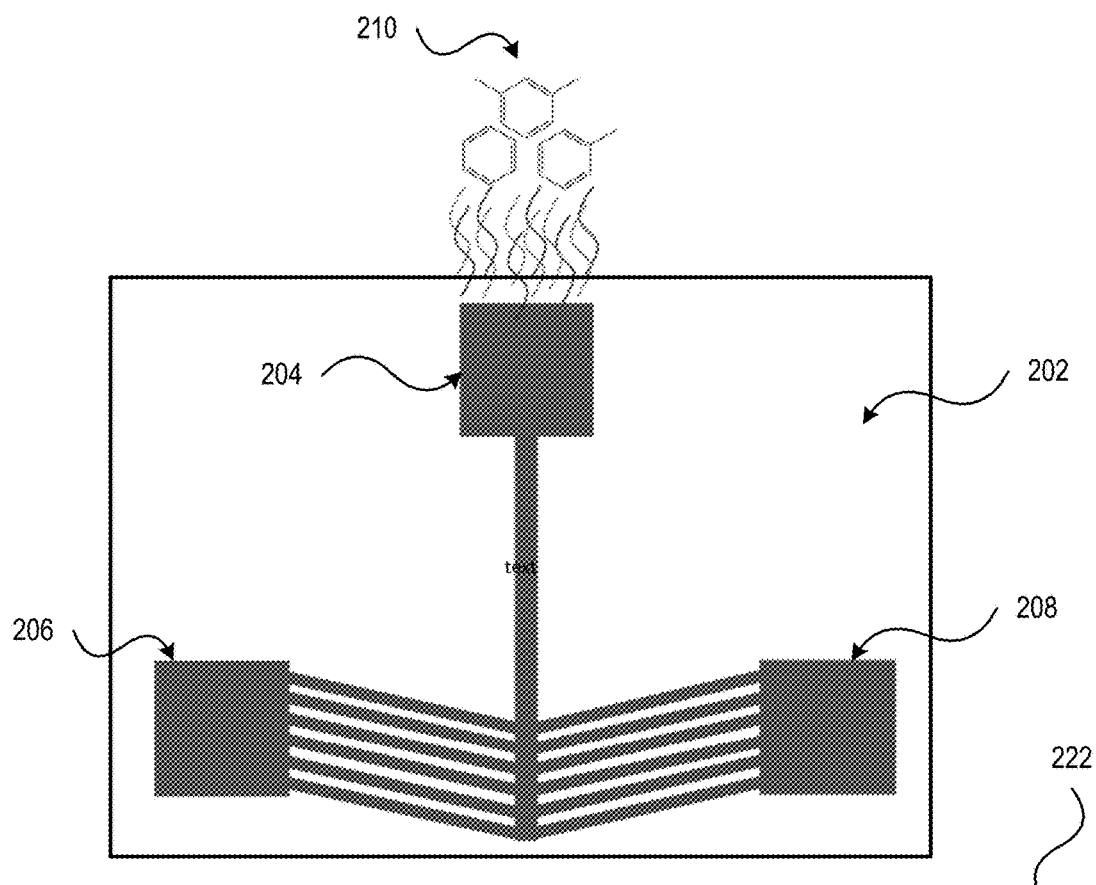
FIG. 2A is a diagram illustrating an exemplary fractionization device in accordance with embodiments of the present disclosure.
Figure 2B:
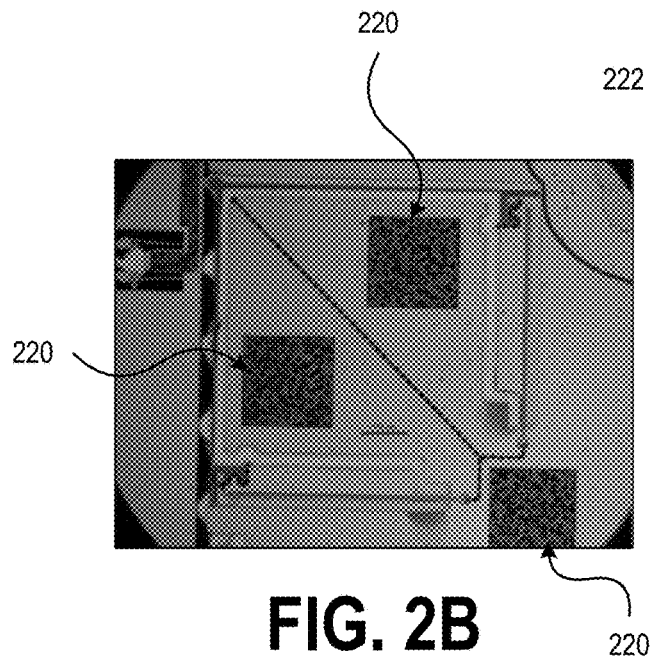
FIG. 2B is an image illustrating an exemplary fractionization device in accordance with embodiments of the present disclosure.
Figure 2C:
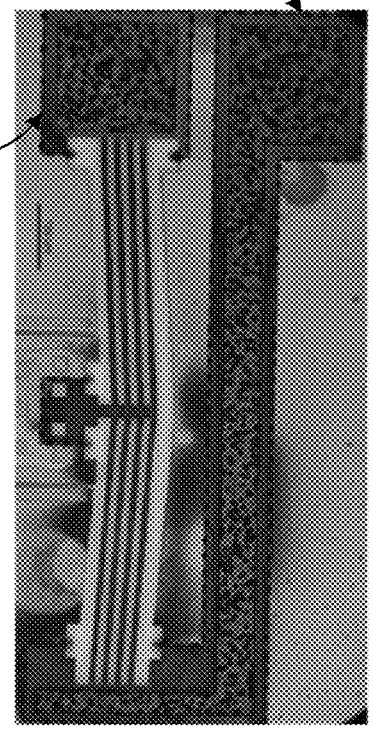
FIG. 2C is another image illustrating an exemplary fractionization device in accordance with embodiments of the present disclosure.

Referring back to FIG. 1 and as briefly described above, the fractionization device 130 may utilize a variety of techniques to fractionate a sample for analysis. To illustrate and referring to FIG. 2A, images illustrating an exemplary configuration of a fractionization device that may be used to fractionize a sample in accordance with aspects of the present disclosures is shown. In FIG. 2A, a substrate 202 and a plurality of microelectromechanical systems (MEMS) 204, 206, 208 are shown. When power is provided to the MEMS 204, 206, 208, significant heat may be generated, which may be used to perform pyrolysis. The heat generated by the MEMS 204, 206, 208 may be sufficient to achieve fractionization of a sample, as shown at 210. To illustrate, a sample to be tested may be placed directly on or proximate one or more of the MEMS 204, 206, 208 and then power may be supplied to the one or more MEMS 204, 206, 208. The heat generated by powering the MEM(s) may fractionize the sample. The fractionization of the sample may produce molecules that may be analyzed (e.g., by the analysis device 110 of FIG. 1), as described in more detail below. It is noted that the sample may be introduced into a fractionization device (e.g., the fractionization device 130 of FIG. 1) in a solid state (e.g., powder, block, or other form), a liquid state, or a gas state. It is noted that in the example shown in FIG. 2 the temperature of the fractionization process may be controlled by adjusting the amount of power provided to the MEMS. It is noted that utilizing one or more of the MEMS shown in FIG. 2A may provide a cost effective manner for performing pyrolysis. For example, the cost of the MEMS may be low, which may allow the MEMS to be disposed of after each use (e.g., to prevent contamination of subsequent samples or for other reasons). Additionally and as explained above, the temperature of the fractionization process may be controlled by controlling the power provided to the MEMS, thereby providing a mechanism for providing the ability fine-tune the temperature at which fractionization is performed and thereby, the ability to control the molecules produced as a result of the fractionization process. Exemplary and non-limiting implementations of the setup shown in FIG. 2A are shown in FIGS. 2B and 2C, which show MEMS 220 and 222, respectively. It is noted that the particular number of MEMS and arrangement of the MEMS shown in FIGS. 2A-2C have been provided for purposes of illustration, rather than by way of limitation and that MEMS-based fractionization devices in accordance with aspects of the present disclosure may utilize less MEMS or more MEMS illustrated herein and that the MEMS may be configured in a layout other than the layouts specifically illustrated in the examples shown in FIG. 2A-2C.

Referring back to FIG. 1, an inlet 132 may be provided to allow a sample to be introduced into the fractionization device 130. In an aspect, the inlet 132 may be a tube or other hollow structure that may allow introduction of a sample into the fractionization device 130. A valve 134 may be provided to close off the inlet 132 and prevent the sample from being released back into an ambient environment during fractionization. Alternatively, a fractionization device 190 may include a door 192 that may be opened to introduce a sample into the fractionization device 190, as shown at 102. It is noted that the exemplary fractionization device configurations shown in FIG. 1 have been provided for purposes of illustration, rather than by way of limitation and that fractionization devices according to embodiments of the present disclosure may be configured using form factors other than the form factors described with reference to FIG. 1.

As briefly described above, the fractionization device 130 may be configured to heat the sample, which causes the sample to be fractionized or broken down into smaller molecules. After the fractionization is complete or as fractionization is performed, the fractionized portions of the sample may be provided to the one or more sampling chambers. For example, a transport tube 140 may be provided to establish fluid communication between the fractionization device 130 and the sampling chamber 150. A valve 142 may be provided to control introduction of the fractionized molecules to the sampling chamber 150 via the transport tube 140. The valve 142 may be configurable to an open position and a closed position. In the open position molecules may flow from the fractionization device 130 through the tube 140 and into the sampling chamber 150. In the closed position molecules may be prevented from flowing from the fractionization device 130 into the sampling chamber 150 via the transport tube 140 (or back into the fractionization device 130 from the sampling chamber 150).

Each of the sampling chambers may include a molecule collector configured to capture one or more molecules of interest. For example, as shown in FIG. 1, the sampling chamber 150 includes a molecule collector 152. The molecule collector 152 may be formed of a material that is tuned to collect the one or more molecules of interest. For example, the material used to form the molecule collector 152 may be Carboxen®, Teslin®, Teflon®, polydimethylsiloxane (PDMS), or another type of suitable material. In an aspect, rather than or in addition to forming the molecule collector from materials configured to capture specific molecules (or specific families of molecules, such as aromatics, ketones, etc.), the molecule collector(s) may also be configured as a heavy molecule collector configured to capture heavy or large molecules (e.g., by bringing the molecule collector to a low temperature, such as approaching or approximating liquid nitrogen temperature). It is noted that exemplary materials and techniques for forming the molecule collector 152 have been provided for purposes of illustration, rather than by way of limitation and that other materials and techniques may be used to provide molecule collectors in accordance with the concepts disclosed herein. As molecules are introduced into the sampling chamber 150, some of molecules may adhere to the molecule collector 152, such as molecules for which the molecule collector 152 has been tuned. When the molecule collector 152 is tuned to capture one or more specific molecules, only those molecules may adhere to the molecule collector and other molecules may not be captured by the molecule collector.

In the embodiment illustrated in FIG. 1, multiple sampling chambers are provided. For example, the sampling chamber 160 is provided and connected in series with the sampling chamber 150 via a tube 170. A valve 172 may be provided to control introduction of molecules from the sampling chamber 150 to the sampling chamber 160. The valve 172 may be configurable to an open position and a closed position. In the open position molecules may flow from the sampling chamber 150 through the tube 170 and into the sampling chamber 160. In the closed position molecules may be prevented from flowing from the sampling chamber 150 into the sampling chamber 160 (or back into the fractionization device 130 from the sampling chamber 150) via the tube 170.

The sampling chamber 160 may include a molecule collector 162. The molecule collector 162 may be formed of a material that is tuned to collect the one or more molecules of interest. For example, the material used to form the molecule collector 162 may be Carboxen®, Teslin®, Teflon®, PDMS, or another type of suitable material. In an aspect, the molecule collector 162 may be a substrate brought to low temperature to capture heavy or large molecules, as described above. It is noted that exemplary materials and techniques for providing the molecule collector 162 have been provided for purposes of illustration, rather than by way of limitation and that other materials and techniques may be used to provide molecule collectors in accordance with the concepts disclosed herein. As molecules are introduced into the sampling chamber 160 some of the molecules may adhere to the molecule collector 162. When the molecule collector 162 is tuned to capture one or more specific molecules, only those molecules may adhere to the molecule collector 162 and other molecules may not be captured.

As can be appreciated from the foregoing, the selective capture capabilities of the molecule collectors 152, 162 enable different molecules to be captured within the sampling chamber 150 and the sampling chamber 160. Thus, when the valve 172 is opened, molecules configured for selective capture by the molecule collector 152 may remain in the sampling chamber 150 and any molecules for which the sampling chamber 150 is not configured to capture may flow to the sampling chamber 160. With respect to the molecules flowing into the sampling chamber 160 from the sampling chamber 150, any molecules configured for capture by the molecule collector 162 may be captured while the remaining molecules remain free (i.e., can be transferred to a next sampling chamber if present or purged from the system). Thus, for example, the molecule collector 152 may be configured to provide selective capture of a first molecule or set of molecules (e.g., ketones) and the molecule collector 162 may be configured to provide selective capture of a second molecule or set of molecules (e.g., aromatics). The different molecules captured by the sampling chambers 150, 160 may enable isolation of different molecules for independent analysis by the analysis device 110, as described in more detail below.

Figure 3:
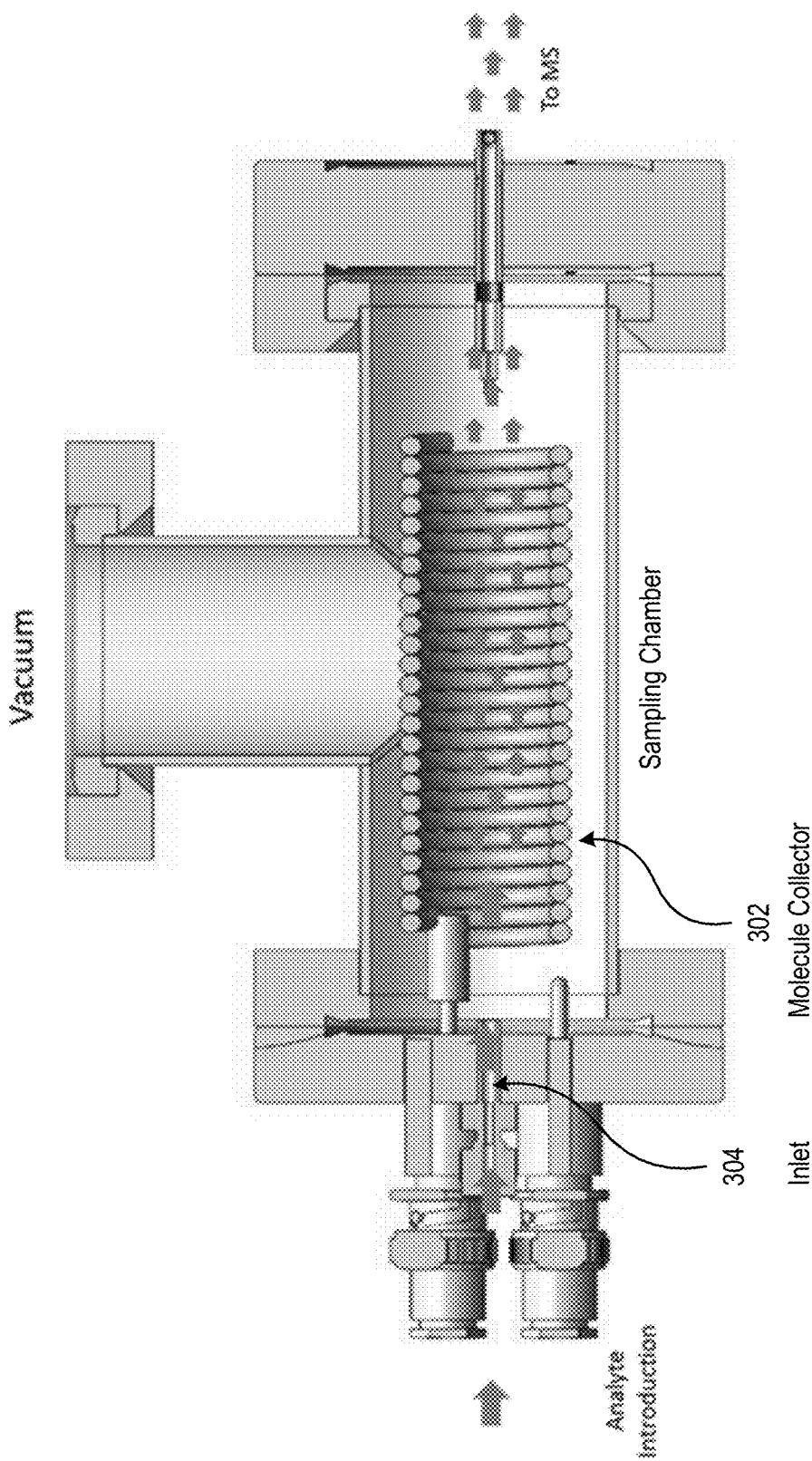
FIG. 3 is an image of an exemplary molecule collector according to embodiments of the present disclosure.

It is noted that the molecule collector 152, 162 may be formed from a single material (e.g., one of the above-described materials), or may be formed from multiple materials, such as a base material that has been coated with one or more of the above-described materials. In aspects, the molecule collectors 152, 162 may have a rigid form factor, such as a plate, a rod, or a mesh formed from the materials mentioned above. The rigid form factor may also be provided in a variety of different shapes. For example and referring to FIG. 3, a molecule collector may be created using a rod formed from or coated with one of the materials described above and the rod may be shaped into a coil 302. Forming the molecule collector as a coil, as shown in FIG. 3, may provide a greater surface area for capturing molecules of interest as compared to a planar substrate, such as a plate or disk. In an additional or alternative aspect, the molecule collectors may have other form factors. For example, a molecule collector may be provided in the form of a powder or mesh made from one or more of the above-described materials. It is noted that the above-described form factors have been provided for purposes of illustration, rather than by way of limitation and the molecule collectors utilized by systems according to the present disclosure may be provided in other form factors and using materials other than those explicitly described herein. In some aspects, different molecule collectors may have different form factors (e.g., a first molecule collector may have a first form factor and a second molecule collector may have a second form factor). It is also noted that some form factors may be advantageous over others. To illustrate, utilizing a molecule collector formed from a packed powder or a coil may increase the surface area of the molecule collector, thereby improving the capability of the molecule collector to capture molecules of interest. Another advantage provided by at least some of the materials described herein is temperature resistance. For example, Carboxen® may be heated to temperatures of at least 700° C. without breaking down or being damaged, thereby enabling the heating element(s) to supply sufficient heat to ensure all molecules are released from the molecule collector for analysis by the analysis device 110.

Referring back to FIG. 1, an outlet 180 may be provided to purge molecules that are not collected by the one or more molecule collectors from the system 100. For example, the outlet 180 may include a valve 182 to control purging of molecules from the sampling chamber(s). The valve 182 may be configurable to an open position and a closed position. In the open position molecules may flow from the sampling chamber 160 (or the last sampling chamber of the system 100 if more than two sampling chambers are provided) through the tube 180 and into an ambient environment or a waste collection device (e.g., a device to contain molecules exiting the system 100). In the closed position molecules may be prevented from flowing from the sampling chamber(s), which may promote collection of the molecules by the molecule collector(s). Purging the uncollected molecules from the sampling chambers prior to providing the collected molecules to the analysis device 110 may reduce the amount of noise observed during analysis of the collected molecule(s). For example, tuning of the molecule collectors may be used to ensure each molecule collector only collects molecules of interest for analysis and all other molecules produced during the fractionization may be purged as described above. This may facilitate a targeted analysis by the analysis device 110. To illustrate, a first molecule collector may be configured to capture molecules of a first type (e.g., fatty acids), a second molecule collector may be configured to capture molecules of a second type (e.g., ketones), and a third molecule collector may be configured to capture molecules of a third type (e.g., aromatics). In this manner, each of the different molecules or molecule types may be isolated in one of the sampling chambers via a tuned molecule collector and then provided, collectively or individually, for analysis by the analysis device 110.

As shown in FIG. 1, the sampling chamber 150 may be connected to the analysis device 110 via a tube 156 and the sampling chamber 160 may be connected to the analysis device 110 via a tube 166. A valve 158 may be provided to control introduction of molecules collected by the molecule collector 152 of the sampling chamber 150 to the analysis device 110 via the tube 156. The valve 158 may be configurable to an open position and a closed position. In the open position molecules collected by the molecule collector 152 may flow from the sampling chamber 150 through the tube 156 and into the analysis device 110 for analysis. In the closed position molecules may be prevented from flowing from the sampling chamber 150 into the analysis device 110. Similarly, a valve 168 may be provided to control introduction of molecules collected by the molecule collector 162 of the sampling chamber 160 to the analysis device 110 via the tube 166. The valve 168 may be configurable to an open position and a closed position. In the open position molecules collected by the molecule collector 162 may flow from the sampling chamber 160 through the tube 166 and into the analysis device 110 for analysis. In the closed position molecules may be prevented from flowing from the sampling chamber 160 into the analysis device 110.

To facilitate release of molecules from the molecule collector(s), each molecule collector may include a heating element. For example, as shown in FIG. 1 the sampling chamber 150 includes a heating element 154 and the sampling chamber 160 includes a heating element 164. The heating elements 154, 164 may be configured to provide or introduce heat into the sampling chambers 150, 160, respectively. The heat may be provided to the molecule collectors 152, 162 directly or indirectly by the heating elements 154, 164, respectively, and the heat may cause the molecules captured by the molecule collectors 152, 162 to be released. Once released, the molecules may be provided to the analysis device 110 for analysis (e.g., via the tubes 156, 166, respectively). It is noted that during the heating process the various valves of the system 100 may configured to their respective open and closed positions to promote introduction of the molecules from the sampling chambers to the analysis device 110. To illustrate, the valves 142, 172, and 182 may be configured to the closed position and the valves 158, 168 may be configured to the open position. In this manner, the molecules of interest for each different sampling chamber may be collectively or simultaneously provided to the analysis device 110. As another example, the valves 142, 172, 182, and 168 may be configured to the closed position and the valve 158 may be configured to the open position to allow only the molecules within the sampling chamber 150 to be provided to the analysis device 110. Subsequently, the valve 158 may be closed and the valve 168 may be opened to allow only the molecules within the sampling chamber 160 to be provided to the analysis device 110. In this manner, the molecules of interest captured by each different sampling chamber may be separately provided to the analysis device 110.

As shown in FIG. 1, the analysis device 110 may include one or more processors 112, a memory 120, one or more analysis components 114, and one or more input/output (I/O) devices 116. The one or more processors 112 may include central processing units (CPUs), graphical processing units (GPUs), microcontrollers, application specific integrated circuits (ASICs), field programmable gate arrays (FPGAs), or other circuitry configured to control operations of the analysis device 110. The memory 120 may include read only memory (ROM), random access memory (RAM), one or more hard disk drives (HDDS), one or more solid state drives (SSDs), or other memory devices configured to store data in a persistent or non-persistent state. The memory 120 may also store instructions 122 that, when executed by the one or more processors 112, cause the one or more processors 112 to control operations of the analysis device 110 and other components of the system 100, such as the heating elements 154, 164, the valves 134, 142, 158, 168, 172, and 182, and/or one or more of the analysis components 114 to facilitate analysis of molecules captured by the sampling chambers 150, 160.

The analysis components 114 may include a mass spectrometer, a THz spectrometer, or other types of devices configured to identify and confirm the presence of one or more molecules of interest based on the molecules captured and released by the sampling chamber(s). In an aspect, the analysis components 114 may also include a pump. The pump may be configured to purge the molecules that are not captured by the one or more sampling chambers from the system 100. For example, the pump may be configured to draw any molecules present in the sampling chambers 150, 160 that are not adhered to the molecule collectors 152, 162 into the outlet 180 and out of the system 100. Once purging is complete, the valve 182 may be closed to prevent reintroduction of the purged molecules (or molecules present in an ambient environment) back into the system 100 and more specifically, the sampling chamber(s).

Where the analysis components 114 include a mass spectrometer, the analysis components 114 may include an ionizer, a mass analyzer, and a detector. The ionizer may be configured to ionize at least the portion of the one or more molecules of interest released from the molecule collector(s) to produce one or more ionized fragments. The mass analyzer may be configured to separate the one or more ionized fragments (e.g., based on a mass of the fragments), and the detector may be configured to identify at least the one of the one or more target molecules of interest based on the separated one or more ionized fragments. Where the analysis components 114 include a THz spectrometer, the analysis components 114 may include an excitation source (e.g., a THz laser) and a detector. The excitation source may be configured to introduce an excitation signal within the sampling chamber(s) subsequent to the release of at least the portion of the one or more molecules of interest from the molecule collector(s), and the detector may be configured to identify the one or more molecules of interest based on one or more characteristics associated with excitation of at least the portion of the one or more molecules of interest.

The I/O devices 116 may include switches, buttons, lights, display devices, or other control elements configured to receive inputs and/or provide outputs in connection with operation of the system 100. For example, switches and/or buttons may be provided to power the system 100 on and off, indicate that a sample has been fractionated, identify one or more target molecules, or other functionality and control features. Lights may be provided to indicate the system 100 is powered on or off, indicate the identified molecules (e.g., different lights may be associated with different molecules of interest that may be identified by the system 100), or to provide other information associated with operation of the system 100. One or more display devices may additionally be provided to display information, such as to display information regarding the identified molecules, information associated with an operational state of the system 100 (e.g., provide information indicating one or more of the different features described above with respect to the lights or other status information), and the like.

It is noted that the system 100 provides several advantages over previous systems that utilized fractionization. For example, whereas previous systems were capable of obtaining results in 15 minutes or longer (e.g., due to the GC separation phase), embodiments of the present disclosure may provide analysis results within 30 seconds. The ability to quickly capture, analyze, and identify molecules may be of particular importance for certain types of molecules identifiable by the system 100. For example, the ability to confirm whether a powder contains anthrax or ricin may enable identification and handling of such hazardous materials to be carried out in a safe manner and prevent injury or even death. Moreover, the ability to use selective molecule collection via one or more molecule collectors that are tuned to specific molecules of interest may also reduce the amount of noise present in the system while providing higher concentrations of target molecules of interest, enabling identification of the molecules of interest with increased accuracy and selectivity. Enhanced accuracy may also be realized by the ability to control the molecules produced by the fractionization devices of embodiments via control controlling temperature, plasma intensity, or other aspects of the fractionization process. The enhanced accuracy may also be realized via the ability of the system 100 to control fractionization to produce the molecules of interest, especially where the molecules of interest may be broken down differently if different temperatures were used to perform fractionization, which may enable more accurate identification of some molecules. Additionally, the selectivity provided by the ability to include one or more sampling chambers, each including a molecule collector tuned to capture specific molecules of interest, may increase the ability to identify molecules or other types of substances. For example, in addition to being able to distinguish between anthrax and ricin, embodiments of the present disclosure may also be able to identify viruses (e.g., COVID-19) and even distinguish between different types of viruses (e.g., coronaviruses and rhinoviruses), which is one challenge that has remained unsolved by previous systems. This may be achieved via a combination of controlling fractionization of viruses into particular molecules (e.g., to provide molecule signatures for virus identification) and selective capture and analysis of those molecules in accordance with the concepts disclosed herein.

In an aspect, an introduction device, such as a nano-manipulator tip, may be used to introduce a sample to the fractionization devices of embodiments. A sample to be tested may be obtained using the introduction device, such as via pinching the sample between tweezer-like foregrips of the device, drawing the sample into a tube at the tip of the device, or other techniques. Once the sample has been obtained, the device may be inserted into a fractionization device and dispensed for fractionization. For example and referring to FIGS. 6A and 6B, a perspective view and cross-section view of a fractionation device in accordance with aspects of the present disclosure is shown as a fractionation device 600. The fractionation device 600 includes a plasma pyrolysis chamber 610, a microvalve inlet 612, and an RF supply 614. A nano-manipulator tip device 620 may be introduced into the plasma pyrolysis chamber 610 via the microvalve inlet 612, where a sample 602 may be introduced directly into the plasma pyrolysis chamber 610. In an aspect, the microvalve inlet 612 may include an aperture (e.g., a hole having a diameter of ⅛ inch or another size) to allow introduction of the sample 602 carried by the nano-manipulator tip device 620 to the plasma pyrolysis chamber 610 of the fractionation device 600. Once presented to the plasma pyrolysis chamber 610, the sample may be broken down into a set of molecules of interest 604 and a set of additional molecules 606. As explained above, the molecules of interest 604 may be captured by one or more molecule collectors while the other molecules 606 may be purged from the system.

Figure 6C:
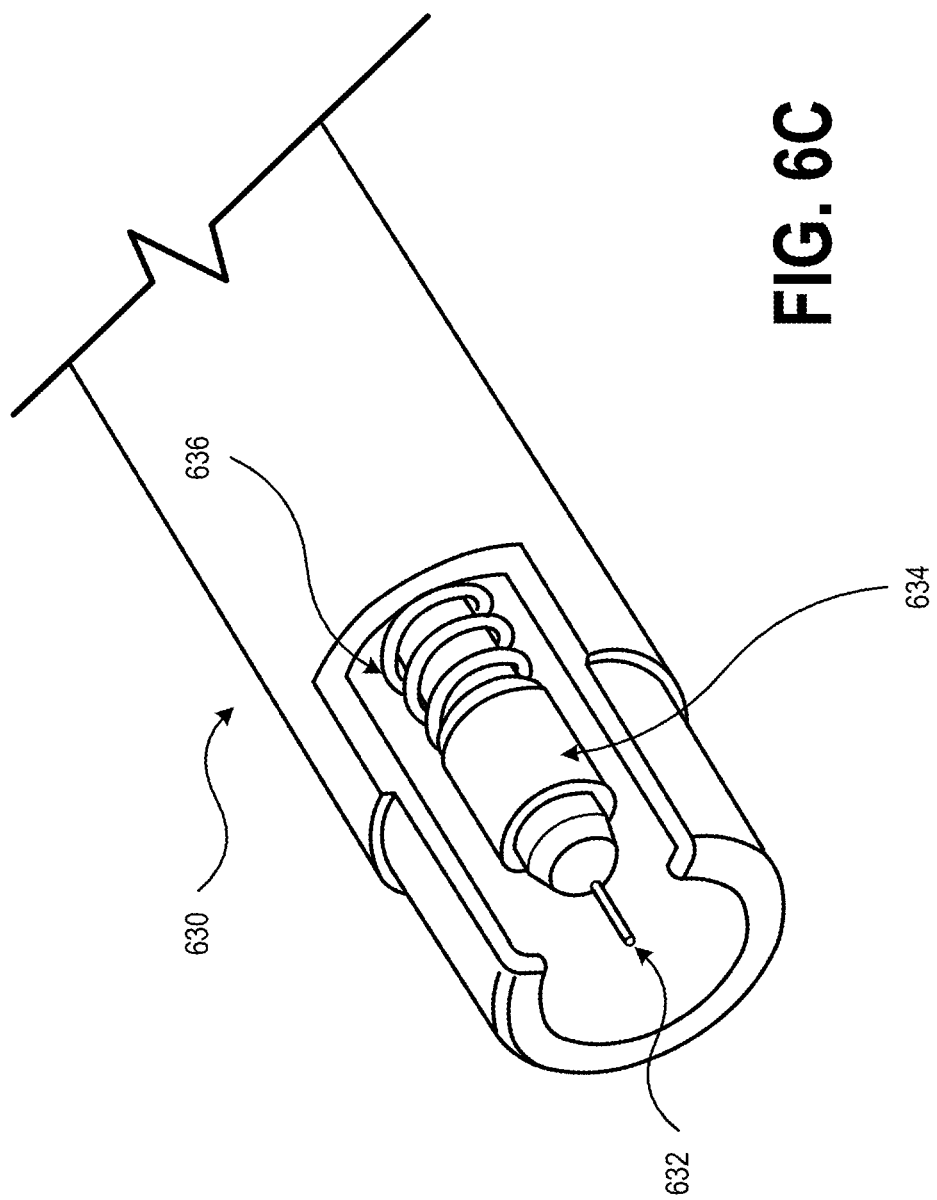
FIG. 6C is a partial view of a system for analyzing samples and illustrates devices and techniques for introducing samples for analysis in accordance with aspects of the present disclosure.

In addition to the use of a nano-manipulator tip, such as the nano-manipulator tip device 620 of FIGS. 6A, 6B, introduction of the sample 602 to the plasma pyrolysis chamber 610 (or another type of fractionation device, such as a MEMS-based fractionation device) may be performed via an aerosol technique. For example and referring to FIG. 6C, a diagram illustrating a partial view of an aerosol introduction device in accordance with the present disclosure is shown as an aerosol introduction device 630. The aerosol introduction device 630 may be configured to spray a sample (e.g., the sample 602 of FIGS. 6A, 6B) into a fractionation device, such as the plasma pyrolysis chamber 610 of FIG. 6B or another type of fractionation chamber. As shown in FIG. 6C, the aerosol introduction device 630 includes a tip 632, a reservoir portion 634, and a resilient member 636. The tip 632 may be used to draw the sample, which may be a liquid, gas, or solid (e.g., a powder) into the reservoir portion 634. Once the sample is disposed in the reservoir portion 634, the aerosol introduction device 630 may be presented to the fractionation chamber in a manner similar to that described above with reference to nano-manipulator tip device 620, and an actuator or other triggering mechanism may utilize the resilient member 636 to apply a force to cause the sample to be dispensed from the reservoir portion 634 via the tip 632. When dispensed, the sample may be in the form of a mist or spray (e.g., when the sample is a liquid or powder) or may simply disperse a stream of the sample (e.g., in a gas form) into the fractionation device. It is noted that the nano-manipulator tip device 620, and aerosol introduction device 630 may be configured to introduce samples into the fractionization device in one or more states (e.g., liquid, gas, solid) and that the exemplary features of these devices has been provided herein for purposes of illustration, rather than by way of limitation. Accordingly, it should be appreciated that other forms of introduction devices may be used in accordance with the present disclosure to introduce a sample to a fractionation device.

Figure 5:
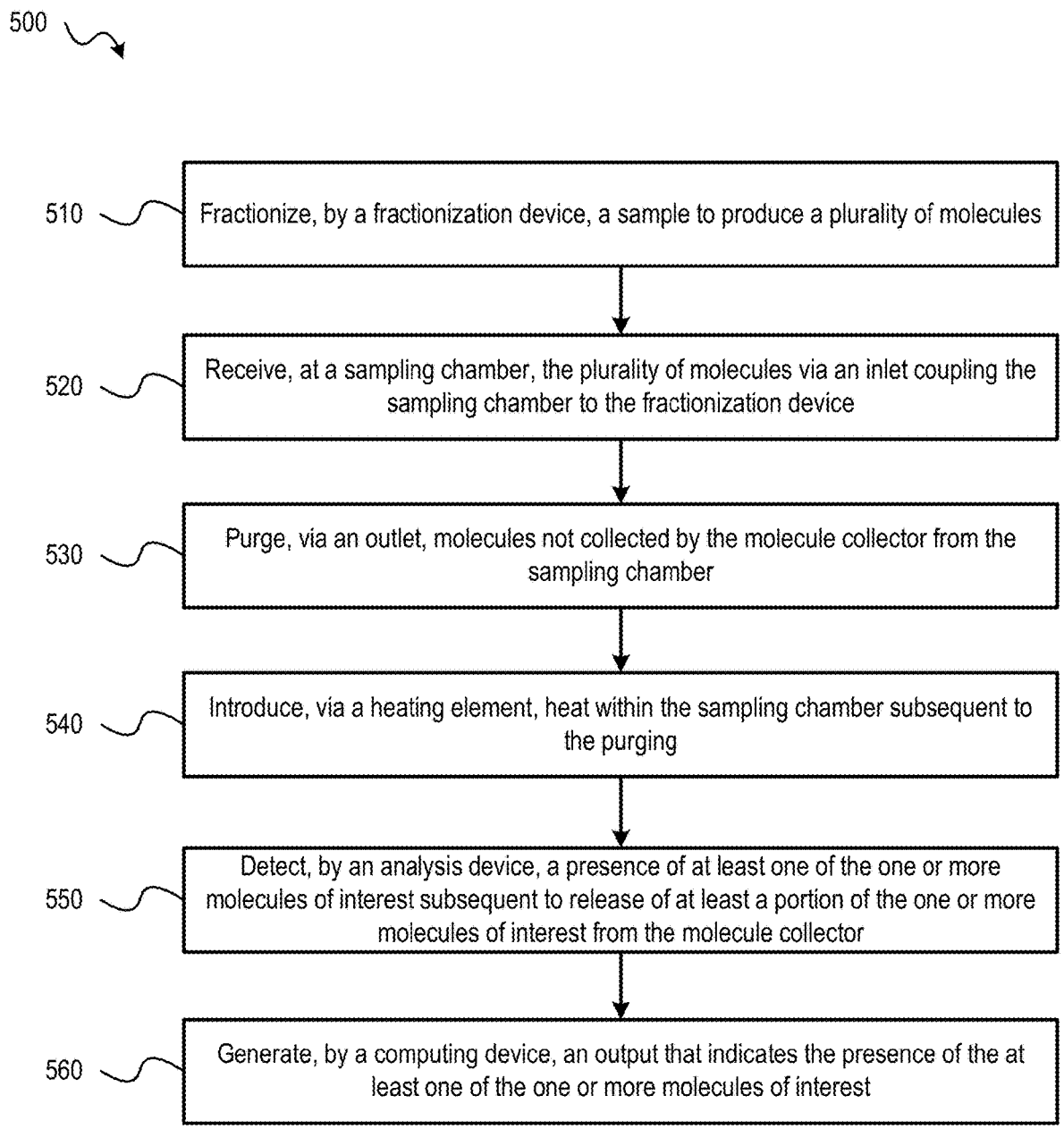
FIG. 5 is a flow diagram of an exemplary method for analyzing a sample in accordance with aspects of the present disclosure.

Referring to FIG. 5, a flow diagram of a method for analyzing a sample in accordance with aspects of the present disclosure is shown as a method 500. In an aspect, the method 500 may be performed by the system 100 of FIG. 1, which may utilize a fractionization device (e.g., the fractionization device 130 of FIG. 1) to analyze a sample. In an aspect, operations or steps of the method 500 may be realized as a program or instructions (e.g., the instructions 122 of FIG. 1) stored at a memory (e.g., the memory 120 of FIG. 1) that, when executed by one or more processors (e.g., the one or more processors 112 of FIG. 1), cause the one or more processors to perform operations for analyzing a sample in accordance with the method 500 and aspects of the present disclosure.

As shown in FIG. 5, the method 500 includes, at step 510, fractionizing, by a fractionization device, a sample to produce a plurality of molecules. As described above, the fractionization device may be configured to produce a plurality of molecules from the sample via pyrolysis, plasma, corona discharge, laser ablation, or another technique. At step 520, the method 500 includes receiving, at a sampling chamber, the plurality of molecules via an inlet coupling the sampling chamber to the fractionization device. As described above with reference to FIG. 1, the sampling chamber may include a molecule collector configured capture one or more molecules of interest present in the plurality of molecules. The molecule collector may be formed from a material selected from Carboxen®, Teslin®, Teflon®, or PDMS. It is noted that the material from which the molecule collector is formed may be tuned to collect molecules of interest while allowing other molecules present in the sampling chamber to not be collected. For example, in an embodiment where multiple sampling chambers are utilized (e.g., the sampling chambers 150, 160 of FIG. 1), a first molecule collector (e.g., the molecule collector 152 of FIG. 1) may be formed of Carboxen® and a second molecule collector (e.g., the molecule collector 162 of FIG. 1) may formed of a different type of Carboxen® or from another type of material (e.g. Teslin®, Teflon®, or PDMS). In an aspect, the molecule collector may have a form factor selected from a plate, a rod, a coil, a mesh, a packed powder, or another form factor. It is noted that different form factors may have difference surface areas which may impact the ability of the molecule collectors to collect molecules of interest.

At step 530, the method 500 may include purging, via an outlet, molecules not collected by the molecule collector from the sampling chamber. In aspects, a pump may be configured to control the purging, as described above with reference to FIG. 1. At step 540, the method 500 may include introducing, via a heating element, heat within the sampling chamber subsequent to the purging. As described above, the heat may be configured to release the one or more molecules of interest from the molecule collector. In an aspect, the heating element may include or be coupled to or include a power source configured to apply a voltage to the molecule collector to introduce the heat within the sampling chamber. In additional or alternative aspects, the heating element may create and/or introduce heat into the sampling chamber to heat the molecules and cause them to release from the molecule collector in a different manner.

At step 550, the method 500 includes detecting, by an analysis device, a presence of at least one of the one or more molecules of interest subsequent to release of at least a portion of the one or more molecules of interest from the molecule collector. In an aspect, the analysis device may be a mass spectrometer, a THz spectrometer, or another type of device adapted to analyze molecules (e.g., an infrared spectrometer, etc.). At step 560, the method 500 includes generating, by a computing device, an output that indicates the presence of the at least one of the one or more molecules of interest. In an aspect, the computing device may include the one or more processors 112, the memory 120, and one or more of the I/O devices 116 of FIG. 1.

As shown above, systems and methods operating in accordance with the above-described aspects of the present disclosure may facilitate detection of molecules of interest from samples via fractionization and selective capture. Such systems may be utilized to rapidly and accurately determine the identity of or presence of harmful substances in the sample. The selective capture capabilities provided by aspects of the present disclosure may improve the accuracy of the system's detection capabilities and reduce the amount of noise present when analyzing samples and improve the speed at which identification may occur. For example, previous systems required GC separation processes and other intermediate steps that introduced delays of 15-30 minutes in the identification process. In contrast, embodiments of the present disclosure do not require GC separation and may identify samples in a matter of seconds (e.g., 15 seconds, 15-30 seconds, or 30-59 seconds). It is noted that the method 600 may also be utilized to perform analysis of samples using more than one sampling chamber, as described above with reference to FIG. 1. It is also noted that persons of ordinary skill in the art will ready recognize that embodiments of the present disclosure provide benefits and advantages in addition to those explicitly described herein.

In an aspect, the method 500 may also be performed multiple times for a same sample or set of samples. To illustrate, the method 500 may be performed multiple times and each time the parameters of the fractionization processes may be changed, such as changing a temperature used for fractionization. In this manner, it may be possible to create new signatures from compounds or molecules (e.g., signatures associated with performing the method 500 multiple times on a single sample or multiple samples) which may enhance the ability to detect or identify the sample. For example, suppose that two different compounds of similar molecular structure could be broken down into similar molecules using a fractionization process. Those similarities may make it difficult to distinguish between the two samples or identify one of the samples as compared to the other. However, using fractionization at different temperatures may produce different sets of molecules that may enable one of the substances to be identified as compared to the other substance(s) and vice versa.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A system for analyzing a sample, the system comprising:
 a fractionization device configured to fractionize the sample;
 a sampling chamber comprising a molecule collector configured to selectively capture one or more molecules of interest produced via fractionization of the sample;
 an inlet coupling the sampling chamber to the fractionization device, wherein molecules generated by the fractionization of the sample are introduced into the sampling chamber via the inlet;
 a heating element configured to introduce heat within the sampling chamber, wherein the heat is configured to release the one or more molecules collected by the molecule collector;
 an outlet, the sampling chamber coupled to a first end of the outlet;
 an analysis device coupled to a second end of the outlet, wherein the analysis device is configured to:
  receive the one or more molecules of interest via the outlet;

detect a presence of at least one of the one or more molecules of interest subsequent to release of at least a portion of the one or more molecules of interest from the molecule collector in response to the heat; and generate an output that indicates the presence of the at least one of the one or more molecules of interest.

2. The system of claim 1, wherein the molecule collector comprises a carbon adsorbent-based material, a polyolefin-based material, a polytetrafluoroethylene-based material (PTFE), or polydimethylsiloxane (PDMS).

3. The system of claim 1, wherein the heating element comprises a power source coupled to the molecule collector and configured to apply a voltage to the molecule collector to introduce the heat within the sampling chamber.

4. The system of claim 1, wherein the analysis device comprises a mass spectrometer, an infrared spectrometer, or a terahertz spectrometer.

5. The system of claim 1, further comprising:
a second sampling chamber comprising a second molecule collector configured to selectively capture one or more additional molecules of interest produced via the fractionization of the sample, wherein the one or more additional molecules of interest are different from the one or more molecules of interest; and
a second heating element configured to introduce heat within the second sampling chamber, wherein the heat introduced into the second sampling chamber is configured to release the one or more additional molecules collected by the second molecule collector.

6. The system of claim 5, wherein the molecule collector and the second molecule collector are formed from a material selected from a carbon adsorbent-based material, a polyolefin-based material, a polytetrafluoroethylene-based material (PTFE), or polydimethylsiloxane (PDMS).

7. The system of claim 5, wherein the molecule collector is formed from a material selected from a carbon adsorbent-based material, a polyolefin-based material, a polytetrafluoroethylene-based material (PTFE), or polydimethylsiloxane (PDMS) and the second molecule collector is formed from a different material selected from a carbon adsorbent-based material, a polyolefin-based material, a polytetrafluoroethylene-based material (PTFE), or polydimethylsiloxane (PDMS).

8. The system of claim 5, wherein the molecule collector is formed from a first type of a material and the second molecule collector is formed from a second type of the material, the material selected from a carbon adsorbent-based material, a polyolefin-based material, a polytetrafluoroethylene-based material (PTFE), or polydimethylsiloxane (PDMS).

9. The system of claim 5, further comprising a second outlet configured to couple the sampling chamber to the second sampling chamber, wherein the one or more additional molecules flow through the sampling chamber to the second sampling chamber via the second outlet.

10. The system of claim 9, further comprising a third outlet, wherein the one or more additional molecules released from the second molecule collector are received by the analysis device via the third outlet.

11. The system of claim 10, further comprising:
a purge outlet configured to purge molecules not collected by the molecule collector or the second molecule collector, the purge outlet coupled to the second sampling chamber; and
a pump configured to control the purging.

12. The system of claim 1, further comprising a purge outlet configured to purge molecules not collected by the molecule collector, the purge outlet coupled to the sampling chamber.

13. The system of claim 12, further comprising a pump configured to control the purging.

14. The system of claim 1, further comprising a first valve and a second valve, the first valve configured to control introduction of the molecules generated by the fractionization of the sample into the sampling chamber and the second valve configured to control reception of the one or more molecules of interest to the analysis device.

15. The system of claim 1, wherein the fractionization device is configured to fractionate the sample via pyrolysis, plasma, laser ablation, or corona discharge.

16. The system of claim 15, further comprising a control device configured to control the molecules generated by the fractionization of the sample, wherein the controlling comprises adjusting a characteristic of the pyrolysis, the plasma, the laser ablation, or the corona discharge.

17. The system of claim 1, wherein the molecule collector has a form factor selected from a plate, a rod, a coil, a mesh, or a packed powder.

18. The system of claim 17, wherein the molecule collector is formed from a material selected from a carbon adsorbent-based material, a polyolefin-based material, a polytetrafluoroethylene-based material (PTFE), or polydimethylsiloxane (PDMS).

19. A method for analyzing a sample, the method comprising:
fractionizing, by a fractionization device, a sample to produce a plurality of molecules;
receiving, at a sampling chamber, the plurality of molecules via an inlet coupling the sampling chamber to the fractionization device, wherein the sampling chamber comprises a molecule collector configured to capture one or more molecules of interest present in the plurality of molecules;
purging, via an outlet, molecules not collected by the molecule collector from the sampling chamber;
introducing, via a heating element, heat within the sampling chamber subsequent to the purging, wherein the heat is configured to release the one or more molecules of interest from the molecule collector;
detecting, by an analysis device coupled to the sampling chamber, a presence of at least one of the one or more molecules of interest subsequent to release of at least a portion of the one or more molecules of interest from the molecule collector; and
generating, by a computing device, an output that indicates the presence of the at least one of the one or more molecules of interest.

20. The method of claim 19, wherein the fractionization device is configured to fractionate the sample via pyrolysis, plasma, laser ablation, or corona discharge, and wherein the method comprises:
controlling the molecules generated by the fractionization of the sample, wherein the controlling comprises adjusting a characteristic of the pyrolysis, the plasma, the laser ablation, or the corona discharge.

* * * * *